United States Patent
Abernathy et al.

(10) Patent No.: US 11,215,777 B2
(45) Date of Patent: Jan. 4, 2022

(54) CABLE SKIN LAYER WITH ACCESS SECTIONS INTEGRATED INTO A CABLE JACKET

(71) Applicant: CORNING RESEARCH & DEVELOPMENT CORPORATION, Corning, NY (US)

(72) Inventors: George Cornelius Abernathy, Hildebran, NC (US); James Arthur Register, III, Hickory, NC (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 0 days.

(21) Appl. No.: 16/934,377

(22) Filed: Jul. 21, 2020

(65) Prior Publication Data

US 2021/0033809 A1    Feb. 4, 2021

Related U.S. Application Data

(60) Provisional application No. 62/881,298, filed on Jul. 31, 2019.

(51) Int. Cl.
   *G02B 6/44* (2006.01)
(52) U.S. Cl.
   CPC .......... *G02B 6/443* (2013.01); *G02B 6/4486* (2013.01); *G02B 6/4494* (2013.01)
(58) Field of Classification Search
   CPC ..... G02B 6/443; G02B 6/4486; G02B 6/4494
   USPC ........................................................ 385/109
   See application file for complete search history.

(56) References Cited

U.S. PATENT DOCUMENTS

| 4,684,214 A | 8/1987 | Goldmann et al. |
| 6,160,940 A | 12/2000 | Summers et al. |
| 6,487,345 B1 * | 11/2002 | Dixon .................... G02B 6/443 385/100 |
| 7,024,081 B2 | 4/2006 | Dowd et al. |

(Continued)

FOREIGN PATENT DOCUMENTS

| CN | 107367812 A | 11/2017 |
| FR | 2793565 A1 | 11/2000 |

(Continued)

OTHER PUBLICATIONS

European Patent Application No. 20187874 Search Report and Search Opinion dated Dec. 11, 2020; 9 Pages; European Patent Office.

*Primary Examiner* — Jerry M Blevins
(74) *Attorney, Agent, or Firm* — William D. Doyle

(57) ABSTRACT

An optical fiber cable includes a central tube having a first inner and a first outer surface. The first inner surface defines a bore along a longitudinal axis of the cable. Optical fibers are disposed within the bore of the central tube. A cable jacket is disposed around the central tube. The cable jacket has a second inner and a second outer surface defining a first thickness. A skin layer is disposed around the cable jacket. The skin layer has a third inner and a third outer surface defining a second thickness that is 100 μm or less. The cable jacket material is different from the skin layer material, and the third outer surface defines the outermost surface of the optical fiber cable. Access sections made of the second material extend from the skin layer into the first thickness of the cable jacket.

16 Claims, 4 Drawing Sheets

(56) References Cited

U.S. PATENT DOCUMENTS

| | | |
|---|---|---|
| 7,082,241 B2 | 7/2006 | Jamet et al. |
| 8,116,604 B2 | 2/2012 | Bonicel et al. |
| 8,582,939 B2 | 11/2013 | Gimblet et al. |
| 8,582,940 B2 | 11/2013 | Abernathy et al. |
| 9,073,243 B2 | 7/2015 | Gimblet et al. |
| 9,140,867 B1 | 9/2015 | Sandate Aguilar et al. |
| 9,142,336 B2 | 9/2015 | Kummer et al. |
| 9,323,022 B2 | 4/2016 | Bringuier et al. |
| 9,904,025 B2 | 2/2018 | Debban et al. |
| 2002/0129966 A1 | 9/2002 | Schneider et al. |
| 2014/0093215 A1* | 4/2014 | Chen .................. G02B 6/4494 385/100 |
| 2017/0235069 A1 | 8/2017 | Risch et al. |
| 2019/0154934 A1* | 5/2019 | Cheng ................. G02B 6/4495 |

FOREIGN PATENT DOCUMENTS

| | | |
|---|---|---|
| JP | 2000-241689 A | 9/2000 |
| JP | 2002-313153 A | 10/2002 |
| WO | 2015/142604 A1 | 9/2015 |

\* cited by examiner

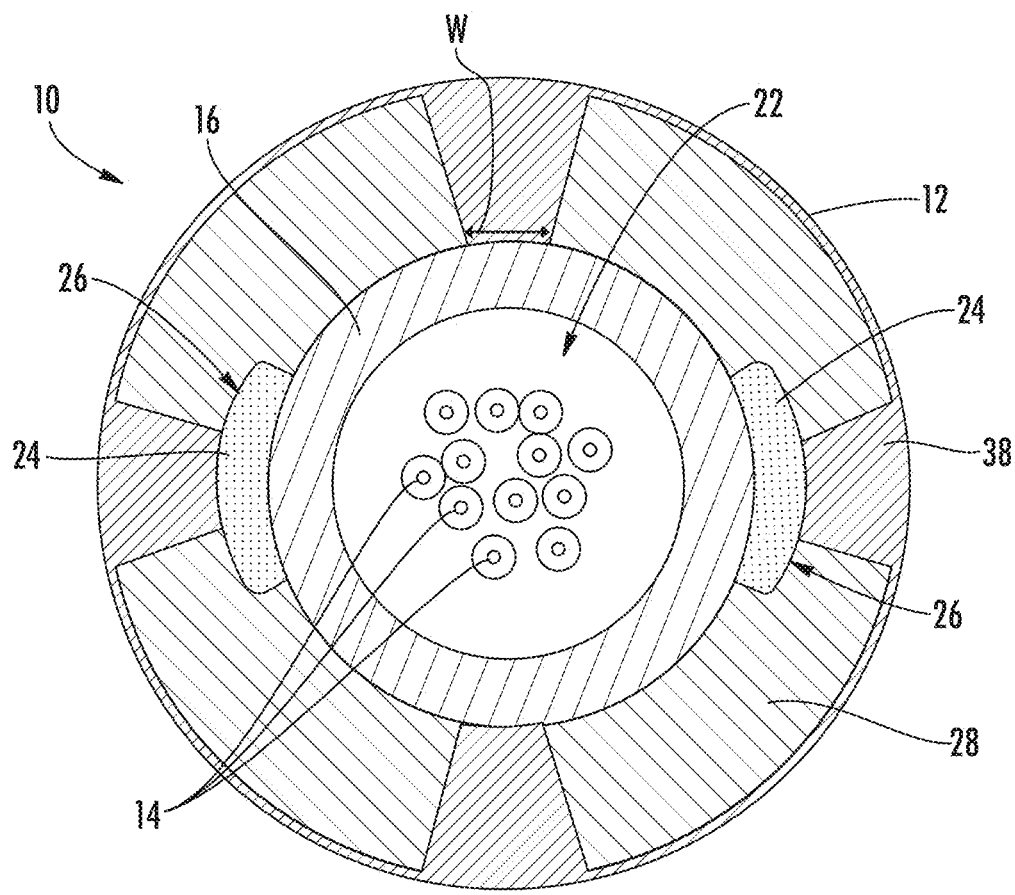
FIG. 4
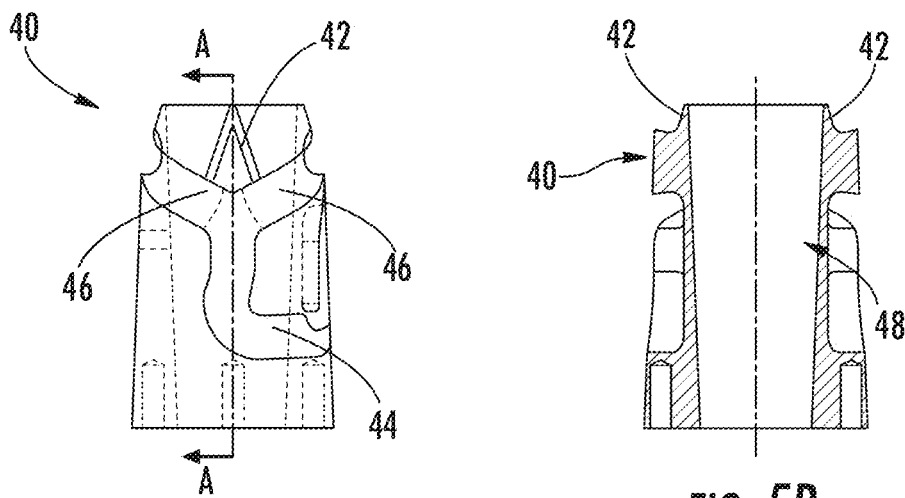
FIG. 5A
FIG. 5B

CABLE SKIN LAYER WITH ACCESS SECTIONS INTEGRATED INTO A CABLE JACKET

CROSS-REFERENCED TO RELATED APPLICATIONS

This application claims the benefit of priority under 35 U.S.C. § 119 of U.S. Provisional Application Ser. No. 62/881,298 filed on Jul. 31, 2019, the content of which is relied upon and incorporated herein by reference in its entirety.

BACKGROUND

The disclosure relates generally to optical fiber cable constructions and more particularly to optical fiber cable constructions having a skin layer to provide a cable jacket having enhanced functionality. Optical fiber cables have a balance of mechanical properties relating to, inter alia, the environment in which they are used, how they are constructed, and how they are installed. Balancing the properties of an optical fiber cable often involves a trade-off in desired properties. For example, utilizing a particular material to achieve a desired environmental property may make construction or installation of the cable more difficult.

SUMMARY

In one aspect, the present disclosure relates to an optical fiber cable. The optical fiber cable includes a central tube having a first inner surface and a first outer surface. The first inner surface defines a bore along a longitudinal axis of the optical fiber cable. At least one optical fiber is disposed within the bore of the central tube. A cable jacket is disposed around the central tube. The cable jacket is made of a first material and has a second inner surface and a second outer surface defining a first thickness therebetween. A skin layer is disposed around the cable jacket and is made of a second material. The skin layer has a third inner surface and a third outer surface defining a second thickness therebetween. The second thickness is 100 µm or less. The first material is different from the second material, and the third outer surface defines the outermost surface of the optical fiber cable. Further, at least one access section made of the second material extends from the skin layer into the first thickness of the cable jacket.

In another aspect, the present disclosure relates to a method of forming an optical fiber cable. In the method, a cable jacket made of a first material is extruded around a central tube. The central tube has an interior bore having at least one optical fiber disposed therein. A skin layer made of a second material is coextruded around the cable jacket. The second material is different from the first material, and the skin layer has a thickness of 100 µm or less. At least one split in the cable jacket is created with an extrusion die so that the second material flows into the at least one split to form at least one access section in the cable jacket.

In still another aspect, the present disclosure relates to an optical fiber cable. The optical fiber cable includes a central tube having a first inner surface and a first outer surface. The first inner surface defines a bore along a longitudinal axis of the optical fiber cable. At least one optical fiber is disposed within the bore of the central tube. A cable jacket is disposed around the central tube. The cable jacket is made of a first material and has a second inner surface and a second outer surface defining a first thickness therebetween. A skin layer is disposed around the cable jacket. The skin layer is made of a second material and has a third inner surface and a third outer surface defining a second thickness therebetween. The second thickness is 100 µm or less. The first material has a first coefficient of friction and a first coefficient of thermal expansion (CTE). The second material has a second coefficient of friction and a second CTE. The second coefficient of friction is less than the first coefficient of friction and the first CTE is less than the second CTE.

Additional features and advantages will be set forth in the detailed description that follows, and in part will be readily apparent to those skilled in the art from the description or recognized by practicing the embodiments as described in the written description and claims hereof, as well as the appended drawing.

It is to be understood that both the foregoing general description and the following detailed description are merely exemplary, and are intended to provide an overview or framework to understand the nature and character of the claims.

BRIEF DESCRIPTION OF THE DRAWING

The accompanying drawing is included to provide a further understanding and are incorporated in and constitute a part of this specification. The drawing illustrates one or more embodiment(s), and together with the description serves to explain principles and the operation of the various embodiments.

FIG. 4 depicts an embodiment of an optical fiber cable having a skin layer and support ribs, according to an exemplary embodiment.

FIGS. 5A and 5B depict embodiments of a cable extrusion die for creating access sections in the cable jacket, according to an exemplary embodiment.

DETAILED DESCRIPTION

Various embodiments of an optical fiber cable having a skin layer around a cable jacket are provided. As will be discussed more fully below, the skin layer enhances a desired property of the cable jacket. For example, the cable jacket may desirably have a low coefficient of thermal expansion but a higher than desired coefficient of friction. Thus, according to the present disclosure, the skin layer is provided around the cable jacket to enhance the property of the coefficient of friction, particularly to lower the coefficient of friction, without substantially diminishing the desired property of the low coefficient of thermal expansion. Other combinations of properties for the cable jacket and skin layer are discussed below. Further, in embodiments, the skin layer is coextruded with the cable jacket, and during coextrusion, access sections are formed that extend into or through the thickness of the cable jacket to provide access to the interior of the cable jacket. Also disclosed herein are embodiments of an optical fiber drop cable in which the optical fibers are contained in a metal tape instead of a central tube or buffer tube. A cable jacket is formed around the metal tape so as to provide a simplified, non-preferential bend drop cable. These and other aspects and advantages will be discussed in relation to the exemplary embodiments disclosed herein. These embodiments of the optical fiber cable disclosed herein are provided by way of example and not by way of limitation.

Figure 1:
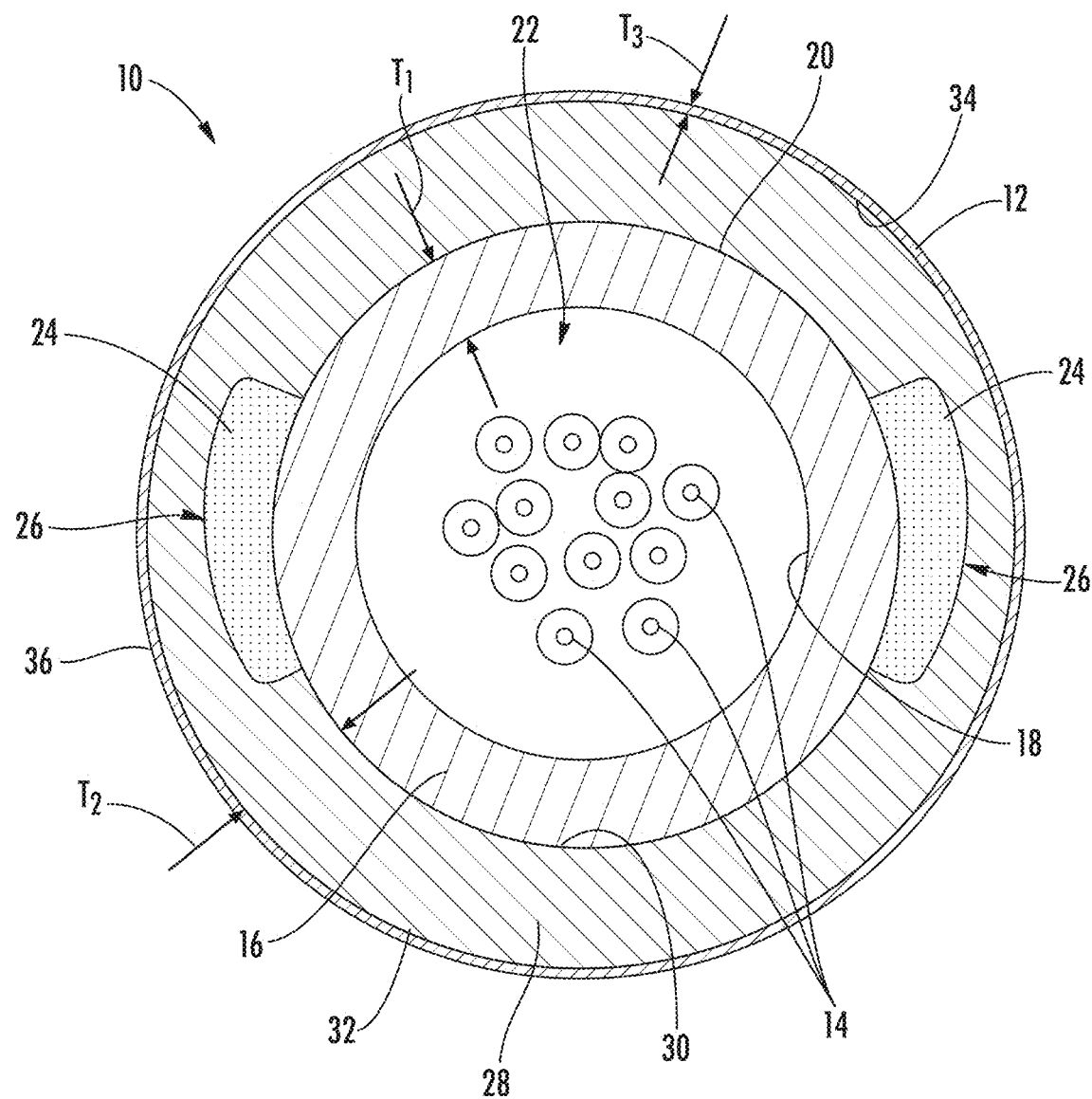
FIG. 1 depicts a longitudinal cross-sectional view of an optical fiber cable having a skin layer, according to an exemplary embodiment.

FIG. 1 depicts an embodiment of an optical fiber cable 10 having a skin layer 12 according to the present disclosure. The optical fiber cable 10 includes a plurality of optical fibers 14 contained within a central tube 16 in a loose tube configuration. The central tube 16 has a first inner surface 18 and a first outer surface 20. The first inner surface 18 defines a central bore 22 in which the optical fibers 14 are disposed. In embodiments, the central tube 16 includes from one to twelve optical fibers 14 within the central bore 22. The central bore 22 may also contain water-blocking material, such as gels, yarns, powders, or tapes. The central tube 16 has a first thickness $T_1$ between the first inner surface 18 and the first outer surface 20. In embodiments, the first thickness $T_1$ is from 0.30 mm to 0.50 mm, more particularly from 0.35 mm to 0.45 mm. In embodiments, the first outer surface 20 defines a diameter of from 2.5 mm to 3.5 mm. In embodiments, the central tube 16 is made from polybutylene terephthalate (PBT), polyester, or another similar material.

On the first outer surface 20 of the central tube 16, a plurality of strengthening yarns 24 are provided. As can be seen in the embodiment of FIG. 1, the strengthening yarns 24 are arranged in diametrically opposed strands 26. In embodiments, each strand 26 includes from one to eight strengthening yarns 24, more particularly four strengthening yarns 24. Further, in embodiments, the strengthening yarns 24 include at least one of aramid fibers, glass fibers, or basalt fibers. In embodiments, the strengthening yarns 24 having a linear density of 1000 denier to 2000 denier, more particularly a linear density of 1400 denier to 1500 denier. In embodiments, the strands 26 of strengthening yarns 24 run straight and longitudinally along the length of the central tube 16. In other embodiments, the strands 26 of strengthening yarns 24 are helically wrapped around the central tube 16.

Surrounding the strengthening yarns 24 is a cable jacket 28. The cable jacket 28 has a second inner surface 30 and a second outer surface 32. The second inner surface 30 contacts the strengthening yarns 24 and, in regions, the first outer surface 20 of the central tube 16. In the region where the second inner surface 30 contacts the central tube 16, the cable jacket 28 has a second thickness $T_2$ between the second inner surface 30 and the second outer surface 32 of from 0.3 mm to 0.85 mm, more particularly from 0.45 mm to 0.7 mm. The skin layer 12 is disposed around the cable jacket 28. In particular, the skin layer has a third inner surface 34 and a third outer surface 36. In embodiments, the third outer surface 36 defines the outermost surface of the optical fiber cable 10 and defines an outer diameter of the optical fiber cable 10 of from 3.75 mm to 5.0 mm. Further, the third inner surface 34 contacts the second outer surface 32 of the cable jacket 28. In embodiments, the skin layer 12 has a third thickness $T_3$ of less than 100 μm, more particularly from 30 μm to 70 μm.

In embodiments, the skin layer 12 is selected to provide a new functionality and/or to enhance a property of the cable jacket 28. For example, the cable jacket 28 may be selected for a particularly desired first property at the expense of (or at least without specific consideration to) another desired second property. The skin layer 12 can address the deficiency in the second property so that the optical fiber cable 10 can take advantage of both the first and second properties. In one embodiment, the cable jacket 28 is selected to provide a low coefficient of thermal expansion (CTE), which provides desirable antibuckling properties. However, in certain circumstances, the low CTE material may also have a relatively high coefficient of friction, which can create difficulty during stranding of optical fiber cables and in installing the optical fiber cables through ducts. Accordingly, in an embodiment, the low CTE cable jacket 28 is provided with a skin layer 12 of a material having a low coefficient of friction. In this way, the optical fiber cables 10 are able to have both desired properties, namely antibuckling provided by the cable jacket 28 and low coefficient of friction provided by the skin layer 12.

In embodiments, the low CTE cable jacket 28 comprises a material that contains from 30% to 60% by weight of one or more polyolefins, from 30% to 60% by weight of one or more thermoplastic elastomers, and up to 20% by weight of one or more inorganic fillers wherein the material comprises a coefficient of thermal expansion of $160(10^{-6})$ m/mK or less. Exemplary polyolefins suitable for use in the low CTE cable jacket 28 include one or more of medium-density polyethylene (HDPE), high-density polyethylene (HDPE), low-density polyethylene (LDPE), linear low-density polyethylene (LLDPE), and/or polypropylene (PP), amongst others. Exemplary thermoplastic elastomers suitable for use in the low CTE cable jacket 28 include one or more of ethylene-propylene rubber (EPR), ethylene-propylene-diene rubber (EPDM), ethylene-octene (EO), ethylene-hexene (EH), ethylene-butene (EB), ethylene-vinyl acetate (EVA), and/or styrene-ethylene-butadiene-styrene (SEBS), amongst others. In embodiments, the inorganic fillers have high aspect ratio and are either rod-like or plate-like. A rod-like filler includes particles that, on average, are longer than they are thick. In a particular embodiment, the rod-like filler particles have, on average, a length to thickness ratio of at least 5:1. In an embodiment, the rod-like filler includes one or more of wood flour, glass fiber, halloysite, wollastonite, magnesium oxysulfate, and/or other reinforced fibers, amongst others. A plate-like filler includes particles that, on average, are both longer and wider than they are thick. In a particular embodiment, the plate-like filler particles have, on average a length to thickness and a width to thickness of at least 5:1. In an embodiment, the plate-like filler includes one or more of mica, talc, montmorillonite, kaolinite, bentonite, synthetic clay, and/or other clays, amongst others.

The composition of the low CTE cable jacket 28 can further include dispersants and/or compatibilizers. Such additives aid filler dispersion, improve compatibilities between polymer matrices, and stabilize the phase morphology. Exemplary compatibilizers include block copolymers that have alternating olefin block and one or more other monomer blocks, i.e., alternating block of polyethylene and styrene containing segment (compatible with SEBS). Exemplary compatibilizers also include a grafted polymer having a polyolefin backbone that is grafted with a monomer that is compatible with the used thermoplastic elastomer. In an embodiment, carbon black is added to the composition, which absorbs ultra-violet light for outdoor applications. The additives, such as dispersants, compatibilizers, carbon black, etc. may be present in the low CTE cable jacket 28 in an amount of up to 5% by weight.

In embodiments, the skin layer 12 comprises a material having a low coefficient of friction, e.g., a coefficient of friction of 0.30 or less, more particularly 0.25 or less, and most particularly 0.20 or less. In embodiments, the skin layer 12 comprises high density polyethylene (HDPE), medium density polyethylene (MDPE), low density polyethylene (LDPE), linear low density polyethylene (LLDPE), ultra high molecular weight polyethylene (UHMWPE), very low density polyethylene (VLDPE), polyamide (e.g., nylon 6, 6/6, 12), polyester, or polyolefin grafted polyamide-6 (PO-g-PA6; e.g., Apolyha® LP21H available from Arkema, Colombes Cedex, France).

Figure 2:
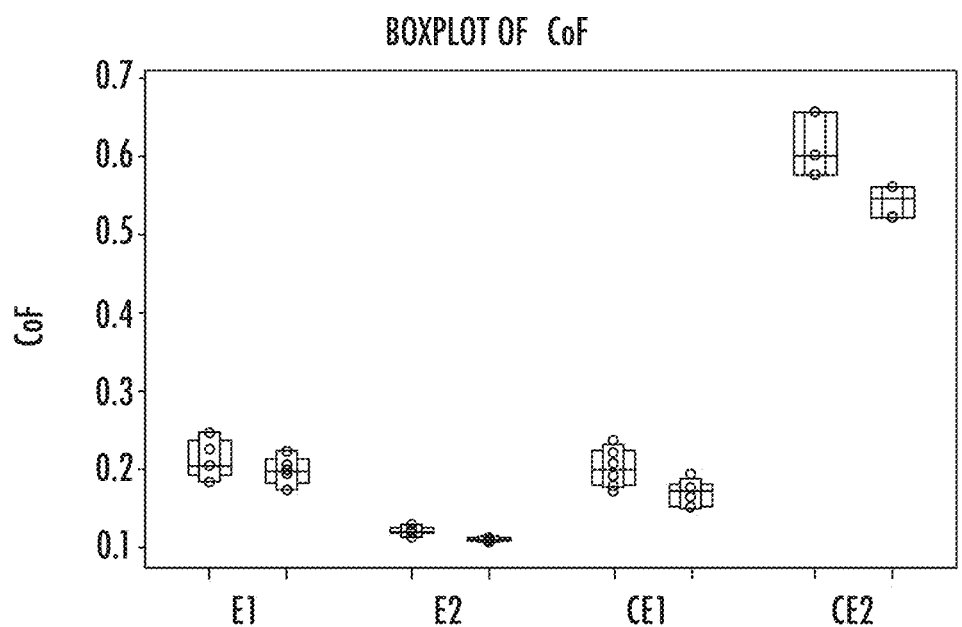
FIG. 2 is a graph of the coefficient of friction (CoF) of exemplary embodiments having a skin layer and comparative examples.

FIG. 2 depicts a graph of the coefficient of friction (CoF) for cables (E1 and E2) having a low CTE cable jacket 28 and a low coefficient of friction skin layer 12 as compared to a cable (CE1) with an MDPE jacket and a cable (CE2) just having a low CTE cable jacket (with no skin layers). The coefficients of friction for each cable were determined according to IEC TR62470. The box plot of FIG. 2 shows CoF values for each cable in an initial test and CoF values for each cable in a repeat test. As can be seen, CE1, having just an MDPE jacket and no skin layer, has a relatively low coefficient of friction of around 0.2. CE2, which just had a low CTE jacket and no skin layer, had a coefficient of friction of around 0.55-0.60. E1 has a cable jacket 28 comprised of a first material which is the low CTE cable jacket 28 and has a skin layer 12 comprised of a second material including PO-g-PA6 having a lower coefficient of friction than the first material. E2 has a cable jacket 28 comprised of a first material which is the low CTE cable jacket 28 and has a skin layer 12 of a second material such as HDPE with a lower coefficient of friction than the first material. The skin layers 12 for E1 and E2 each may have a thickness of about 50 μm. E1 and E2 each had a coefficient of friction of less than 0.3, and were both about 0.21 or less. Thus, using a thin skin layer 12, a low coefficient of friction cable can be provided that also has the advantages provided by a low CTE cable jacket 28. Additionally, the cable of E2 also provides improved impact resistance, in particular being able to withstand two impacts per location at 2.94 Nm impact energy according to ICEA-640.

While the properties of low CTE cable jacket 28 and low coefficient of friction skin layer 12 were described, other combinations of properties are also possible. For example, in embodiments, the optical fiber cable 10 has a cable jacket 28 comprising polyvinylchloride (PVC). The PVC cable jacket 28 provides cost-effective flame retardance for cables used both indoors and outdoors. However, in some circumstances, the PVC cable jacket 28 does not pass the cold impact testing per ICEA-640. In such circumstances, the PVC cable jacket 28 may be provided with a skin layer 12 of polyvinylidene fluoride (PVDF), which helps the optical fiber cable 10 pass the cold impact testing while also improving flame retardant performance. In particular, the cable 10 having the PVC cable jacket 28 and PVDF skin layer 12 has improved crush and impact performance and an improvement in burn testing.

In still another embodiment, the skin layer 12 is used to facilitate connectorizing a cable. In particular, certain connectors use heat shrink materials, such as cross-linked polyolefins including having an adhesive layer of ethylene vinyl acetate (EVA) or polyamide-modified EVA, to prevent water ingress at the connection. In certain circumstances, the cable jacket 28 is made from a material, such as PVC or polyethylene, that includes plasticizers that prevents a stable bond to the heat shrink material, or the material from which the cable jacket 28 is made may not be compatible with the heat shrink material. In such embodiments, the skin layer 12 (such as a PO-g-PA6) can be used to provide a layer compatible with the cable jacket 28 and heat shrink material or that prevents migration of plasticizers that would render the bond unstable.

Figure 3:
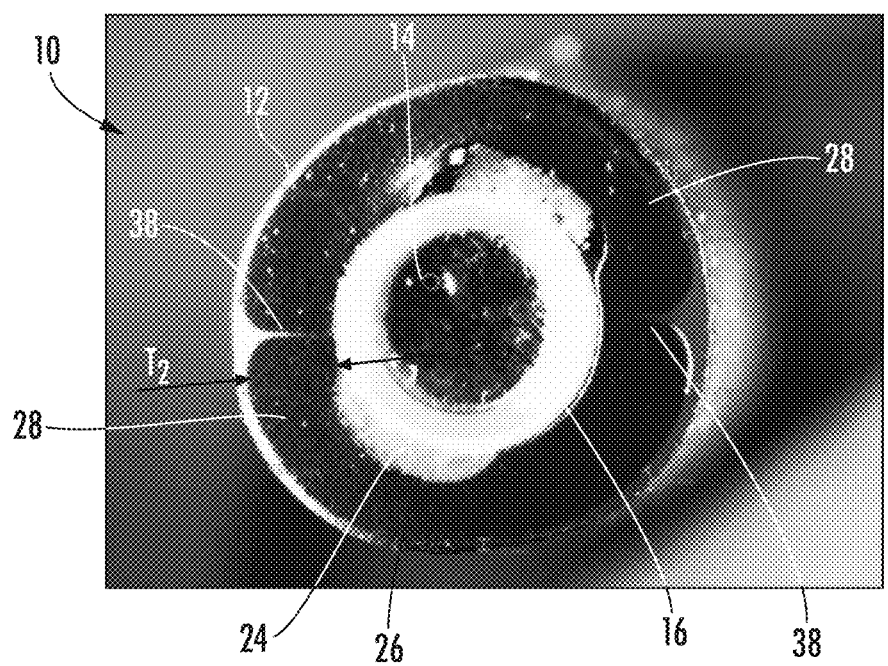
FIG. 3 depicts an embodiment of an optical fiber cable having a skin layer with access sections extending into the cable jacket, according to an exemplary embodiment.

The skin layer 12 can also be co-extruded with the cable jacket 28 in a manner that provides the optical fiber cable 10 with a fast access feature. FIG. 3 is a photograph of an optical fiber cable 10 having a skin layer 12 with access sections 38 that extend into the cable jacket 28. In the embodiment shown in FIG. 3, the access sections 38 are formed during coextrusion of the skin layer 12 with the cable jacket 28. In particular, a flow splitter is used during extrusion to create a discontinuity in the extruded cable jacket 28, which is filled with the material of the skin layer 12. In the embodiment shown in FIG. 3, the access section 38 extends substantially through the second thickness $T_2$ of the cable jacket 28. In embodiments, the access section 38 extends through at least 50% of second thickness $T_2$ of the cable jacket 28. In other embodiments, the access section 38 extends through at least 80% of second thickness $T_2$ of the cable jacket 28. Further, two, diametrically-opposed access sections 38 are shown in FIG. 3, but in other embodiments, the optical fiber cable 10 can include a single access section 38 or a plurality of access sections 38, including as many as four access sections 38. When there is a plurality of access sections, each one of the access sections 38 may be generally spaced equidistantly apart around the circumference of the cable 28.

FIG. 4 depicts an embodiment of an optical fiber cable 10 including four access sections 38. Further, as compared to the embodiment of FIG. 3, the access sections 38 of FIG. 4 are wider and, besides providing access to the interior of the optical fiber cable 10, the access sections 38 also act as support ribs that provide, e.g., additional crush resistance and/or antibuckling properties at cold temperatures. In embodiments, the width W of the access sections 38 (as measured at their narrowest point) is from 0.1 mm to 0.3 mm. Further, in embodiments, the access sections 38 contain additional fillers and/or low CTE material to enhance the support rib function.

Embodiments of the optical fiber cable 10 as described above can be formed via a coextrusion process in which the central tube 16 containing the plurality of optical fibers 14 is coated with the cable jacket 28. During extrusion of the cable jacket 28, the skin layer 12 is coextruded around the cable jacket 28. In order to form the access sections 38, an extrusion die 40 as shown in FIGS. 5A-5B is used. As shown in FIG. 5A, the extrusion die 40 includes a flow splitter feature 42. By increasing the depth, width, and angle of the flow splitter feature 42, the amount of material deposited in the access sections 38 can be adjusted, e.g., to form the support ribs shown in FIG. 4. The material of the skin layer 12 flows through a first channel portion 44, through second channel portions 46 and over the flow splitter feature 42. The material flowing over the flow splitter feature 42 forms the access sections 38, and the material flowing over the second channel portions 46 forms the skin layer 12.

FIG. 5B depicts a cross-section of the extrusion die 40 of FIG. 5A taken along line A-A. The extrusion die 40 has a central bore 48 along a longitudinal axis of the extrusion die 40. The central tube 16 having strands 26 of strengthening yarns 24 extending alongside the central tube 16 and having molten cable jacket 28 material extruded thereon is pulled through the extrusion die 40 where the skin layer 12 is applied over the cable jacket 28, also forming the access sections 38. In this way, an optical fiber cable 10 having access sections 38 and a skin layer 12 is formed. As discussed above, the optical fiber cable 10 exhibits the beneficial properties of both the cable jacket 28 and the skin layer 12.

In another aspect of the present disclosure, embodiments of an optical fiber drop cable 100 are provided. The optical fiber drop cable 100 includes a plurality of optical fibers 102 disposed within a central bore 104 formed by an armor tape 106, e.g., steel tape. In particular, a flat (i.e., non-corrugated) armor tape 106 is formed around a bundle of optical fibers 102. In embodiments, the bundle of optical fibers 102 may also include water-blocking yarns to prevent water from propagating within the central bore 104 formed by the armor tape 106. Surrounding the armor tape 106 is a cable jacket 108. The cable jacket 108 has an interior surface 110 and an exterior surface 112. The interior surface 110 is in contact with the armor tape 106, and the exterior surface 112 defines the outermost surface of the optical fiber drop cable 100. In embodiments, the exterior surface 112 defines an outer diameter of the optical fiber drop cable 100 of from 4.0 mm to 5.5 mm, e.g., about 4.8 mm.

In embodiments, the optical fibers 102 are bare fibers comprising a core, cladding, coating, and optionally a pigment or ink layer for identification. Further, in embodiments, the armor tape 106 has a thickness of from 0.1 mm to 0.2 mm, and in embodiments, the armor tape 106 is made from at least one of steel or aluminum. In embodiments, when wrapped around the bundle of optical fibers 102 and water-blocking yarn (if provided) the armor tape 106 has a diameter of from 1 mm to 3 mm. In embodiments, the cable jacket 108 is made from at least one of medium density polyethylene (MDPE), high-density polyethylene (HDPE), low-density polyethylene (LDPE), linear low-density polyethylene (LLDPE), very low density polyethylene (VLDPE), polypropylene (PP), ethylene vinyl acetate (EVA), ethylene-acrylate copolymers, polyolefin elastomer copolymer, polyethylene-polypropylene copolymer, butene- and octene-branched copolymers, or maleic anhydride-grafted versions of the foregoing polymers.

Figure 7:
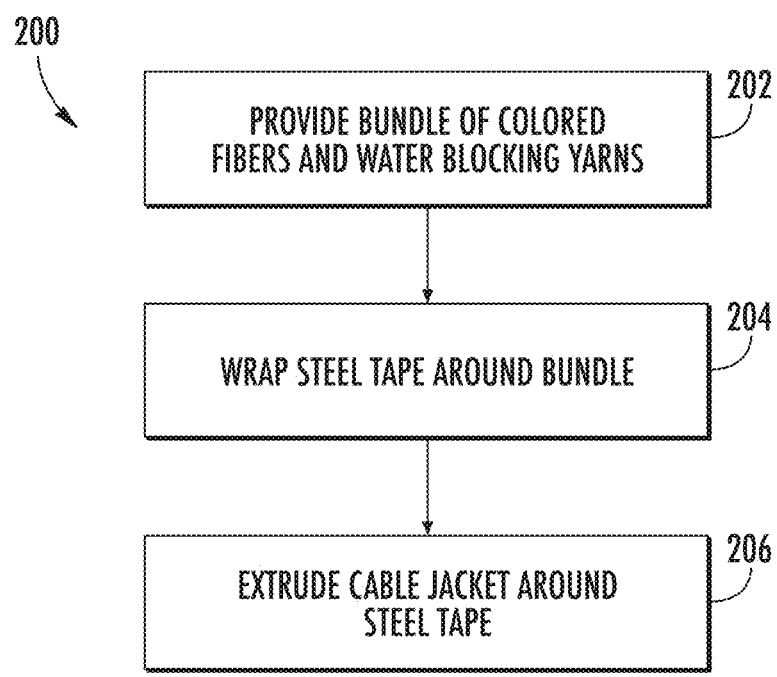
FIG. 7 depicts a flowchart for a method of preparing the optical fiber drop cable of FIG. 6, according to an exemplary embodiment.

FIG. 7 provides a flow diagram of a method 200 of forming the optical fiber drop cable 100. In a first step 202 of the method 200, a bundle of optical fibers 102 are provided along with any water blocking yarns that are to be incorporated into the optical fiber drop cable 100. In embodiments, the optical fibers 102 are color-coded for identification purposes. In embodiments, the bundle includes from one to twelve optical fibers 102.

In a next step 204, an armor tape 106 (e.g., steel tape) is wrapped around the bundle of optical fibers 102 and water-blocking yarns. As mentioned above, the armor tape 106 is flat and not corrugated. In an embodiment, the longitudinal edges of the armor tape 106 overlap by, e.g., 0.1 mm to 0.5 mm once wrapped around the bundle of optical fibers 102.

After the armor tape 106 is wrapped around the bundle of optical fibers 102, the cable jacket 108 is extruded over the armor tape 106 in a final step 206.

Figure 6:
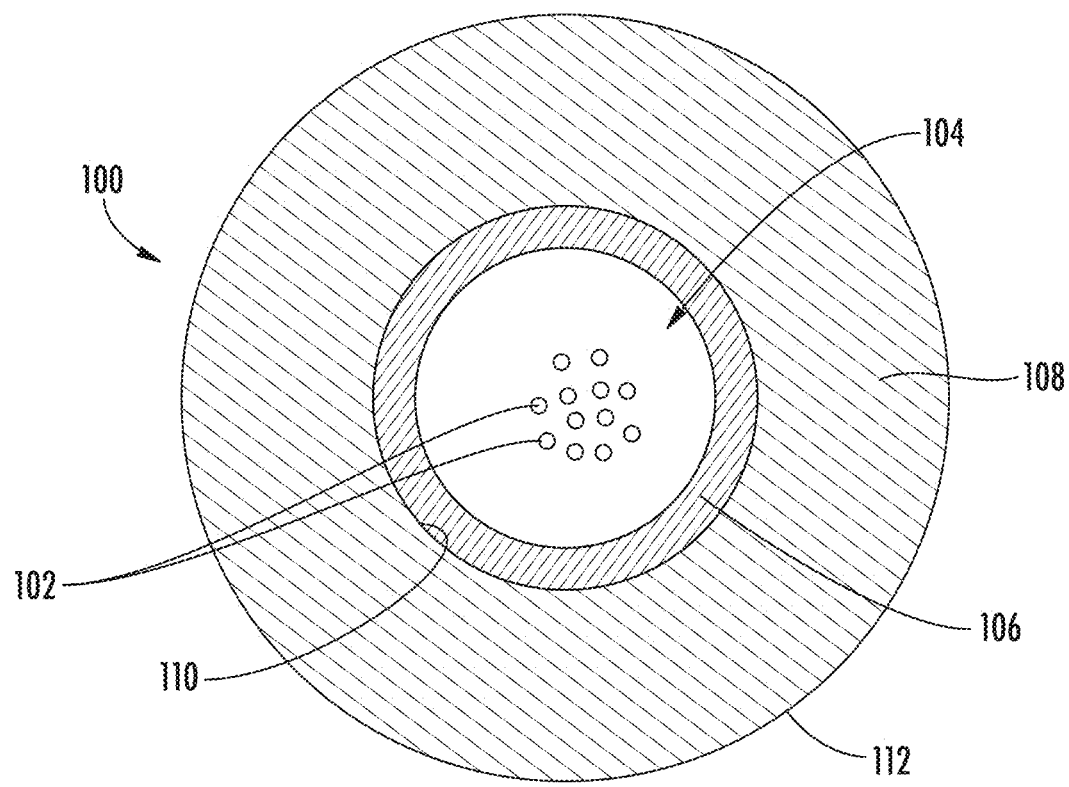
FIG. 6 depicts an embodiment of an optical fiber drop cable in which the optical fibers are contained within a wrapped armor layer surrounded by a cable jacket, according to an exemplary embodiment.

Advantageously, the cable constructed according to the embodiment shown in FIG. 6 via the method of FIG. 7 does not include any buffer tubes or strengthening rods, which creates a drop cable 100 having a relatively small diameter and without having a preferential bend direction. By comparison, some conventional cable designs include multiple glass-reinforced plastic rods that create a preferential bending axis, making routing the drop cable through ducts with turns in multiple direction difficult. Further, as compared to traditional loose tube and central tube cables, the optical fiber drop cable 100 contains less layers of material, which reduces the overall size of the cable.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. An optical fiber cable, comprising:
   a central tube having a first inner surface and a first outer surface, wherein the first inner surface defines a bore along a longitudinal axis of the optical fiber cable;
   at least one optical fiber disposed within the bore of the central tube;
   a cable jacket disposed around the central tube, the cable jacket comprising a first material and having a second inner surface and a second outer surface defining a first thickness therebetween;
   a skin layer disposed around the cable jacket, the skin layer comprising a second material and having a third inner surface and a third outer surface defining a second thickness therebetween, the second thickness being 100 µm or less;
   wherein the first material is different from the second material;
   wherein the third outer surface defines an outermost surface of the optical fiber cable;
   wherein at least one access section comprising the second material extends from the skin layer into the first thickness of the cable jacket.

2. The optical fiber cable of claim 1, wherein the first material has a first coefficient of friction and the second material has a second coefficient of friction, and wherein the second coefficient of friction is less than the first coefficient of friction.

3. The optical fiber cable of claim 2, wherein the second coefficient of friction is 0.30 or less.

4. The optical fiber cable of claim 2, wherein the first material comprises from 30% to 60% by weight of one or more polyolefins, from 30% to 60% by weight of one or more thermoplastic elastomers, and up to 20% by weight of one or more inorganic fillers and wherein the first material comprises a coefficient of thermal expansion of $160(10^{-6})$ m/mK or less.

5. The optical fiber cable of claim 4, wherein the skin layer comprises at least one of high density polyethylene (HDPE), medium density polyethylene (MDPE), low density polyethylene (LDPE), very low density polyethylene (VLDPE), linear low density polyethylene (LLDPE), ultra high molecular weight polyethylene (UHMWPE), a polyamide, a polyester, or a polyolefin grafted polyamide-6.

6. The optical fiber cable of claim 1, wherein the cable jacket comprises polyvinyl chloride and the skin layer comprises polyvinylidene fluoride.

7. The optical fiber cable of claim 1, wherein the at least one access section extends through at least 80% of a thickness of the cable jacket.

8. The optical fiber cable of claim 1, wherein the at least one access section has a narrowest width of from 0.1 mm to 0.3 mm.

9. The optical fiber cable of claim 1, comprising at least two access sections, wherein the at least two access sections are equidistantly spaced around the cable jacket.

10. The optical fiber cable of claim 1, wherein the second thickness of the skin layer is 50 µm or less.

11. A method of forming an optical fiber cable, comprising:
   extruding a cable jacket comprising a first material around a central tube, wherein the central tube comprises an interior bore having at least one optical fiber disposed therein;
   coextruding a skin layer comprising a second material around the cable jacket, wherein the second material is different from the first material and wherein the skin layer has a thickness of 100 µm or less; and
   creating at least one split in the cable jacket with an extrusion die so that the second material flows into the at least one split to form at least one access section in the cable jacket.

12. The method of claim 11, wherein the first material has a first coefficient of friction and the second material has a second coefficient of friction and wherein the second coefficient of friction is less than the first coefficient of friction.

13. The method of claim 12, wherein the second coefficient of friction is 0.30 or less.

14. The method of claim 12, wherein the first material comprises from 30% to 60% by weight of one or more polyolefins, from 30% to 60% by weight of one or more thermoplastic elastomers, and up to 20% by weight of one or more inorganic fillers and wherein the first material comprises a coefficient of thermal expansion of $160(10^{-6})$ m/mK or less.

15. The method of claim 11, wherein the cable jacket comprises polyvinyl chloride and the skin layer comprises polyvinylidene fluoride.

16. The method of claim 11, wherein the skin layer has the second thickness of 50 µm or less.

* * * * *